US012573188B2

(12) United States Patent
Johnston et al.

(10) Patent No.: US 12,573,188 B2
(45) Date of Patent: Mar. 10, 2026

(54) OBJECT COUNTING SYSTEM USING CONVOLUTIONAL NEURAL NETWORK FOR MEDICAL PROCEDURES

(71) Applicant: The Cleveland Clinic Foundation, Cleveland, OH (US)

(72) Inventors: Douglas Johnston, Shaker Heights, OH (US); Cristiano Quintini, Beachwood, OH (US); Edward Soltesz, Westlake, OH (US); Jose Romero, Avon, OH (US); William Kolosi, Stow, OH (US); Thomas Kadavy, Bellevue, WA (US)

(73) Assignee: The Cleveland Clinic Foundation, Cleveland, OH (US)

( * ) Notice: Subject to any disclaimer, the term of this patent is extended or adjusted under 35 U.S.C. 154(b) by 550 days.

(21) Appl. No.: 17/869,988

(22) Filed: Jul. 21, 2022

(65) Prior Publication Data

US 2023/0027114 A1     Jan. 26, 2023

Related U.S. Application Data

(60) Provisional application No. 63/224,146, filed on Jul. 21, 2021.

(51) Int. Cl.
*G06V 10/82* (2022.01)
*G06N 3/08* (2023.01)
*G06V 10/764* (2022.01)

(52) U.S. Cl.
CPC .............. *G06V 10/82* (2022.01); *G06N 3/08* (2013.01); *G06V 10/764* (2022.01)

(58) Field of Classification Search
CPC ...... G06N 3/08; G06V 10/143; G06V 10/764; G06V 10/82; G06V 2201/034
See application file for complete search history.

(56) References Cited

U.S. PATENT DOCUMENTS

| | | | |
|---|---|---|---|
| 9,168,104 B2 | 10/2015 | Dein | |
| 10,765,563 B2 | 9/2020 | Dein | |
| 10,976,806 B1 * | 4/2021 | Vancamberg | ........ A61B 5/0091 |
| 2011/0282331 A1 * | 11/2011 | Brennan | .................. A61B 5/24 |
| | | | 606/4 |
| 2018/0181864 A1 * | 6/2018 | Mathew | ................... G06N 3/04 |
| 2018/0268240 A1 * | 9/2018 | Loce | .................... G06V 10/764 |
| 2018/0276841 A1 * | 9/2018 | Krishnaswamy | ...... G06V 10/25 |
| 2019/0362839 A1 | 11/2019 | Quintini et al. | |
| 2020/0050893 A1 * | 2/2020 | Suresh | ..................... G06N 3/08 |
| 2020/0082002 A1 * | 3/2020 | Whitman | ............... G06F 17/18 |

(Continued)

FOREIGN PATENT DOCUMENTS

WO          2020247258          12/2020

OTHER PUBLICATIONS

Zhaorui Chen et al., "Surgical Instruments Tracking Based on Deep Learning with Lines Detection and Spatio-Temporal Context," Jan. 1, 2018, 2017 Chinese Automation Congress (CAC), pp. 2711-2714.*

(Continued)

*Primary Examiner* — Omar S Ismail
(74) *Attorney, Agent, or Firm* — Tucker Ellis LLP

(57)          ABSTRACT

The present disclosure relates to a system and method for recognizing objects used in a medical procedure using a convolutional neural network. No database of image information for such objects is used or required. Rather, the neural network is trained to recognize the objects, and does not require any such image database. The system is able to reconcile the recognized objects against a 'counted-in' list of objects for the procedure, to ensure that all such objects are accounted for prior to closing the procedure.

16 Claims, 5 Drawing Sheets

(56) References Cited

U.S. PATENT DOCUMENTS

| 2020/0184248 | A1* | 6/2020 | Donhowe | A61B 34/25 |
|---|---|---|---|---|
| 2020/0237452 | A1* | 7/2020 | Wolf | G06F 3/048 |
| 2020/0261162 | A1* | 8/2020 | Woods | A61B 90/37 |
| 2020/0273575 | A1* | 8/2020 | Wolf | B25J 9/1661 |
| 2020/0273581 | A1* | 8/2020 | Wolf | G16H 40/63 |
| 2020/0297444 | A1* | 9/2020 | Camarillo | G06N 3/094 |
| 2020/0387704 | A1* | 12/2020 | Ng | G06T 7/70 |
| 2021/0000564 | A1 | 1/2021 | Amanatullah et al. | |
| 2021/0290317 | A1* | 9/2021 | Sen | G06N 3/0464 |
| 2021/0307841 | A1* | 10/2021 | Buch | A61B 5/4893 |
| 2022/0061953 | A1 | 3/2022 | Quintini et al. | |
| 2022/0108124 | A1* | 4/2022 | Umezawa | G06F 18/285 |
| 2022/0125400 | A1* | 4/2022 | Wu | G06N 3/02 |
| 2022/0164576 | A1* | 5/2022 | Yang | G06N 3/09 |
| 2022/0233229 | A1* | 7/2022 | Jürgens | A61B 5/7264 |
| 2023/0027114 | A1* | 1/2023 | Johnston | G06V 10/143 |

OTHER PUBLICATIONS

Congmin Yang et al. , "Image-based laparoscopic tool detection and tracking using convolutional neural networks: a review of the literature," Sep. 4, 2020, Computer Assisted Surgery 2020, vol. 25, No. 1, pp. 15-25.*

Duygu Sarikaya et al., "Detection and Localization of Robotic Tools in Robot-Assisted Surgery Videos Using Deep Neural Networks for Region Proposal and Detection," Jun. 29, 2017, IEEE Transactions on Medical Imaging, vol. 36, No. 7, Jul. 2017, pp. 1542-1548.*

Dongqing Zang et al., "An Extremely Fast and Precise Convolutional Neural Network for Recognition and Localization of Cataract Surgical Tools," Oct. 10, 2019, Medical Image Computing and Computer Assisted Intervention—MICCAI 2019. MICCAI 2019, pp. 57-62.*

Zijian Zhao et al., "Real-time tracking of surgical instruments based on spatio-temporal context and deep learning," Feb. 14, 2019, Computer Assisted Surgery 2019, vol. 24, No. S1, pp. 20-28.*

Pan Shi et al., "Real-Time Surgical Tool Detection in Minimally Invasive Surgery Based on Attention-Guided Convolutional Neural Network," Dec. 31, 2020, IEEEAccess, pp. 228853-228859.*

Boping Ran et al., "Surgical Instrument Detection Algorithm Based on Improved YOLOv7x," May 24, 2023, Sensors 2023, 23, 5037 , pp. 1-16.*

International Search Report and Written Opinion for PCT/US2022/037803, dated Oct. 17, 2022, 13 pages.

SurgiCount+ surgical sponge. Stryker. Accessed via Web on Jul. 20, 2022. https://www.safeor.com/products/surgicount.

* cited by examiner

OBJECT COUNTING SYSTEM USING CONVOLUTIONAL NEURAL NETWORK FOR MEDICAL PROCEDURES

CROSS-REFERENCE TO RELATED APPLICATIONS

This application claims the benefit of U.S. Provisional Patent Application No. 63/224,146 filed Jul. 21, 2021, whose contents are incorporated by reference.

BACKGROUND

Medical personnel utilize many different items during the course of a medical procedure (e.g., surgical operation). These items can include sponges and instruments, such as scalpels, needles, and other sharp objects (hereinafter "sharps"). Although every effort may be made to avoid leaving objects in a surgical field (e.g. a cavity of the patient) prior to closing, mistakes can occur. In the event an object is left inside the patient, a second surgery is required to remove the object, thereby increasing the risk of potential side effects and further injury to the patient.

In view of the above, some technologies exist for assisting medical personnel in counting the number of objects utilized during surgery to ensure that each object is accounted for prior to ending the surgery. For example, one existing device images a sharp object and then compares the image to a database of existing sharps images to identify the sharp object. See U.S. Pat. Nos. 9,168,104 and 10,765,563. Once identified through comparison against pre-existing sharps images, the sharp can be counted against an initial inventory of the sharps used during the surgery.

Existing systems for identifying and counting sharps suffer from a number of deficiencies. For example, they require maintaining a database of images for known/existing sharps. As such, additional resources are required to support the system and it is not possible to automatically identify new/unknown sharps. Further, the systems rely on detailed shape recognition algorithms, wherein the shapes and curvatures of individual sharps are compared to the database images of prior-known sharps in order to find a match. But not all sharps (particular newer ones not yet entered in the database) will possess conforming shapes or curvatures, which can lead to inaccurate comparisons for identification purposes. For example, the presence of a suture tail may affect the shape detected through conventional imaging, and existing systems do not always reliably distinguish suture tails from the sharps to properly identify the latter through database-image comparisons. Therefore, a need exists for improved surgical object counting and identification.

BRIEF SUMMARY

According to one example of the present disclosure, a system for identifying objects used in a medical procedure is provided. The system includes a user interface; a camera; and at least one processor and memory. The processor and memory are configured to: receive images of the objects after each object is used in the medical procedure, wherein the images are captured by the camera; input the images into a convolutional neural network (CNN) configured to output a classification and a confidence score for each of the objects in each inputted image; identify the objects in the images according to the outputted classifications and confidence scores therefor; reconcile each of the objects identified in the images with a counted-in list of objects for the medical procedure; and output information related to the reconciliation via the user interface.

Also disclosed is a method that includes: generating a counted-in list of a plurality of objects to be used during a medical procedure; imaging the objects after use in the medical procedure, thereby generating at least one image; inputting the at least one image into a convolutional neural network (CNN) configured to output a classification and a confidence score for each object in the at least one image; identifying the objects in the at least one image according to the outputted classification and confidence score; reconciling each of the objects identified in the at least one image against the counted-in list; and outputting information related to the reconciliation.

A further system disclosed herein includes at least one processor and memory configured to implement a convolutional neural network (CNN). The CNN is configured to: receive images of objects used during a medical procedure; and output a classification of each object in the images and a confidence score corresponding to each classification. The CNN is configured to receive the images via a network from a plurality of remote locations.

DETAILED DESCRIPTION OF THE DRAWING

The present disclosure is directed to a surgical object identification and counting system, and a method that utilizes a convolutional neural network (CNN) or like machine learning for identification and counting of objects captured within images taken during or appurtenant to a medical procedure. The system and method of the present disclosure can be configured to identify the presence of distinct objects in a field of view, to identify sizes of the objects for purposes of, for example, maintaining an intraoperative inventory, and to distinguish between the object itself and other debris in the field of view (e.g., distinguish between a needle and a suture tail). According to the disclosure, no comparison to a database of images is made or required. Nor is knowledge, or use of, needle curvature dimensions required, nor any curvature calculations. The disclosed system and method may provide safer sharps management. For example, because shape comparisons are not required, there is no need to manually collect needles and trim suture tails to improve recognition of the suture shape. These steps therefore can be omitted in methods for counting surgical objects, including sharps, associated with a medical procedure. Further, the CNN improves object identification and counting accuracy, thereby reducing the number of recounts and need for additional patient operations.

Numerous distinct surgical objects (instruments) can be used in surgery. These include, for example, sharps such as needles, sponges, vessel clamps, etc. Prior to closing a surgical field, it is important to ensure that all such objects and instruments have been removed from the patient. In order to do that, according to the disclosed system and method, each such object first is accounted for (i.e. "counted in") prior to use, either at the start of the procedure or as it is requested by the surgeon during the procedure. Once a particular object's use is completed, it is then imaged and the image input to the CNN, in order to "count out" that object. Finally, at the conclusion of the procedure and prior to closing the surgical field, the 'counted out' objects can be compared to those 'counted in,' to generate a reconciliation report to ensure that all surgical objects have been accounted for—i.e. to reconcile the list of 'counted out' objects against the list of 'counted in' objects.

Figure 1A:
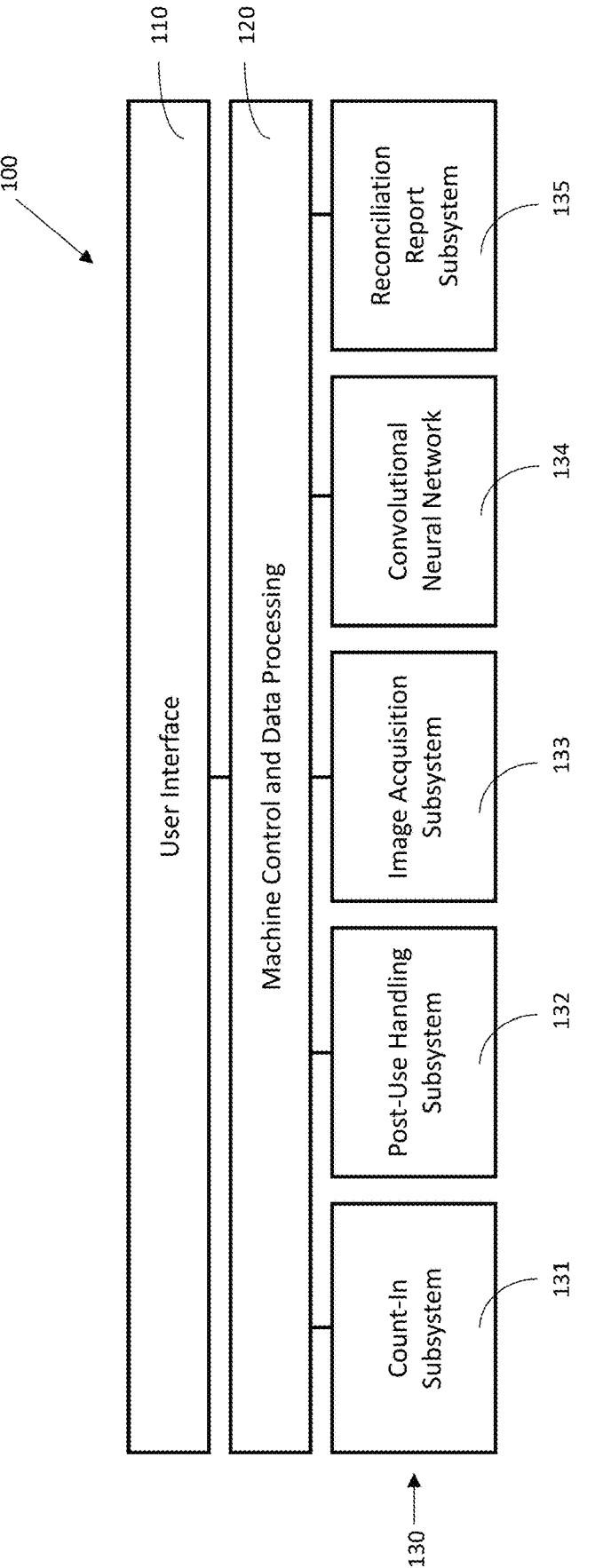
FIGS. 1A and 1B illustrate example system architectures of the present disclosure.
Figure 1B:
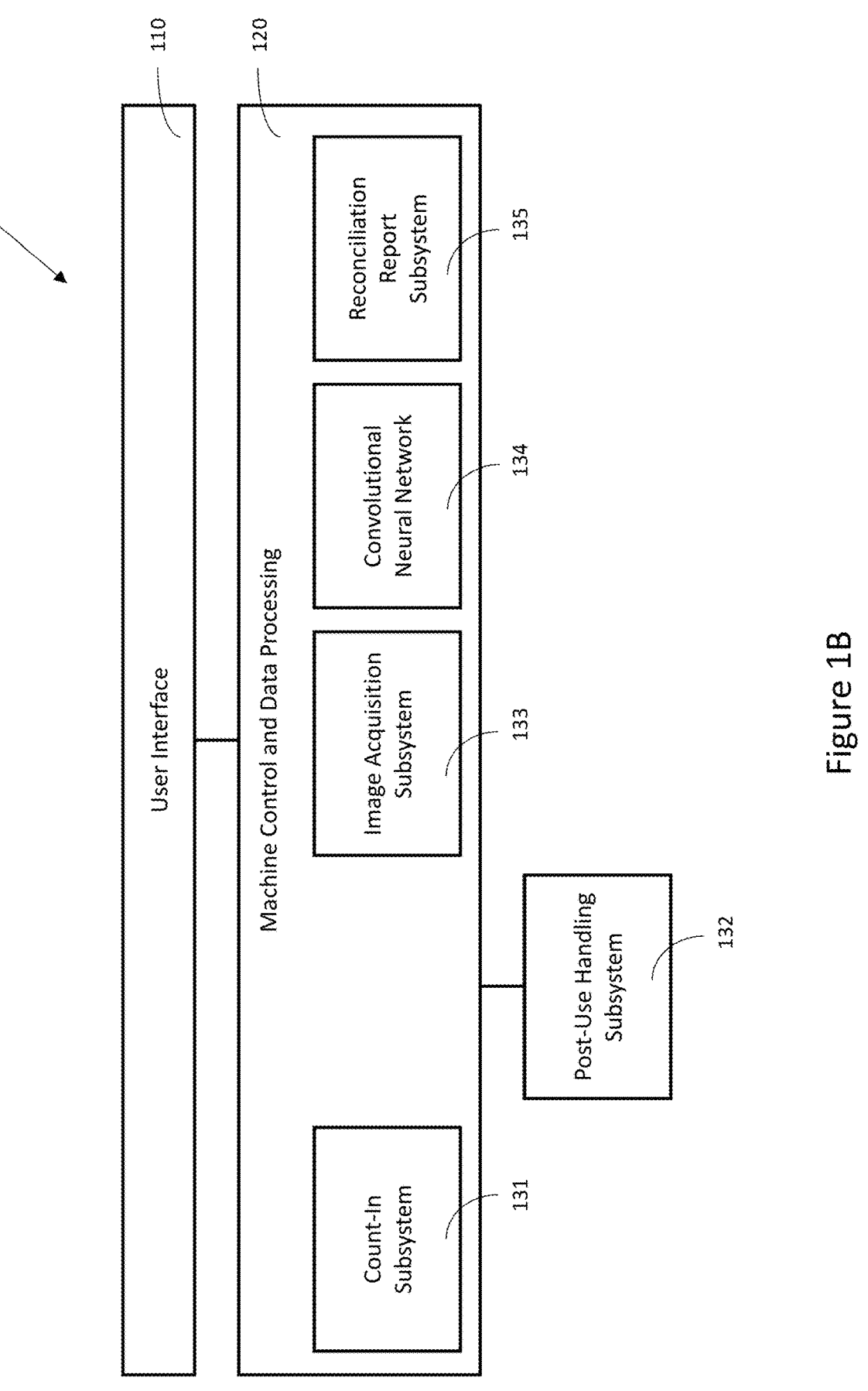

Example system architectures for performing such a method are illustrated in FIGS. 1A and 1B. As seen in FIG. 1A, the example system 100 includes a user 110 interface, a machine control and data processing system 120 (e.g., one or more processors and/or memories), and a plurality of subsystems 130 that perform different functions as will be described. The user interface 110 can be or include one or more input and/or output devices, with which the user can enter control inputs and receive data and information from the system associated with its operation. Input devices within the user interface 110 may include a touch screen, mouse, keyboard, and the like to receive inputs from a user to control system operation. Output devices within the user interface 110 may include a display screen an audio output device (e.g., speakers), indicator lights, and the like to display or convey information to the user.

The data processing system 120 may include one or more processor(s), computer storage/memory(ies), computers, and the like adapted or programmed to process image data and to execute the algorithmic steps as hereafter described. The data processing system 120 can be coupled to a variety of subsystems 130 useful in the disclosed methods. These subsystems can include a count-in subsystem 131, a post-use handling subsystem 132, an image acquisition subsystem 133, the convolutional neural network (CNN) 134 or like machine learning system discussed above, and a reconciliation report subsystem 135. Each of these subsystems (described below) is illustrated in FIG. 1A as a discrete subsystem that is implemented separately (e.g., as their own processor(s), computer storage/memory(ies), computers, discretely housed devices, and the like) and connected to, used or in communication with the data processing system 120 in order to exchange data and information in accordance with the disclosed methods. However, at least the count-in, image-acquisition, convolutional neural network and reconciliation-report subsystems 131, 133, 134, 135 can be implemented within and as part of the data processing system 120 as illustrated in FIG. 1B, e.g. as programmed modules or subroutines stored on one or more memory(ies) and executed by one or more processor(s) within the data processing system 120.

The count-in subsystem determines and accounts for the objects being (or to be) used for the medical procedure (i.e. it "counts in" such objects), and maintains a list of such objects. It is against the list of 'counted in' objects that the subsequently 'counted out' objects, as recognized by the CNN, will be reconciled as further described. In one embodiment, the objects may be inputted directly by a user via the user interface 110. For example, the user may select objects from a list of available objects presented on a touchscreen of the user interface 110. Or the user may scan barcodes, QR codes or other object-specific, machine-readable indicia associated with each object as it is prepared for use in the medical procedure or supplied to the surgeon during the procedure. Alternatively or in addition to such manual input, the CNN 134 (discussed in more detail below) may be used to automatically recognize objects prior to being used during the medical procedure, and then supply the identities of the recognized objects to the count-in subsystem to be 'counted in.' All such inputted, detected (e.g. via machine-readable indicia) and/or machine-recognized (via the CNN) objects will be 'counted in' by the count-in subsystem, and populated to a list of such objects that must be accounted for before the medical procedure can be concluded later on.

The post-use handling subsystem 132 may include, for example, a device to hold and retain objects used during the medical procedure after their use. Such a device may be, for example, a bio-hazard bin in which objects are deposited and held after being 'counted out' as described below, following their use in the procedure. Alternatively, the device may be a continuous tape or strip to which objects are deposited sequentially along its length; or it may be a tray having a plurality of spaced-apart deposit stations in or onto which a corresponding plurality of objects may be deposited as they are withdrawn from the medical procedure. In the latter embodiment, the individual objects may be imaged and identified by the CNN 134 as-deposited onto the tape/strip or tray in an imaging station of the image-acquisition subsystem 133 (described below), so that the tape/strip or tray itself serves both as a holder for imaging the object(s) and as a receptacle to contain such objects for storage, re-counts (if desired), and ultimately disposal. In any case, the post-use handling subsystem 132 allows collection of all objects used in the medical procedure in case a re-count of all objects is desired, and provides safe storage of the objects as or after they are 'counted out' until the end of the procedure, and beyond.

The particular embodiment of the device(s) used to accumulate and hold objects from the medical procedure is not critical to the disclosed method and system. Examples of both strip/tape- and tray-type holding devices, in order to both capture surgical objects and hold them for imaging and recognition, are disclosed in U.S. patent application Ser. No. 17/734,434 filed May 2, 2022, and Ser. No. 17/462,204 filed Aug. 31, 2021 (published as US2022/0061953), the contents of which are incorporated herein by reference.

Figure 2:
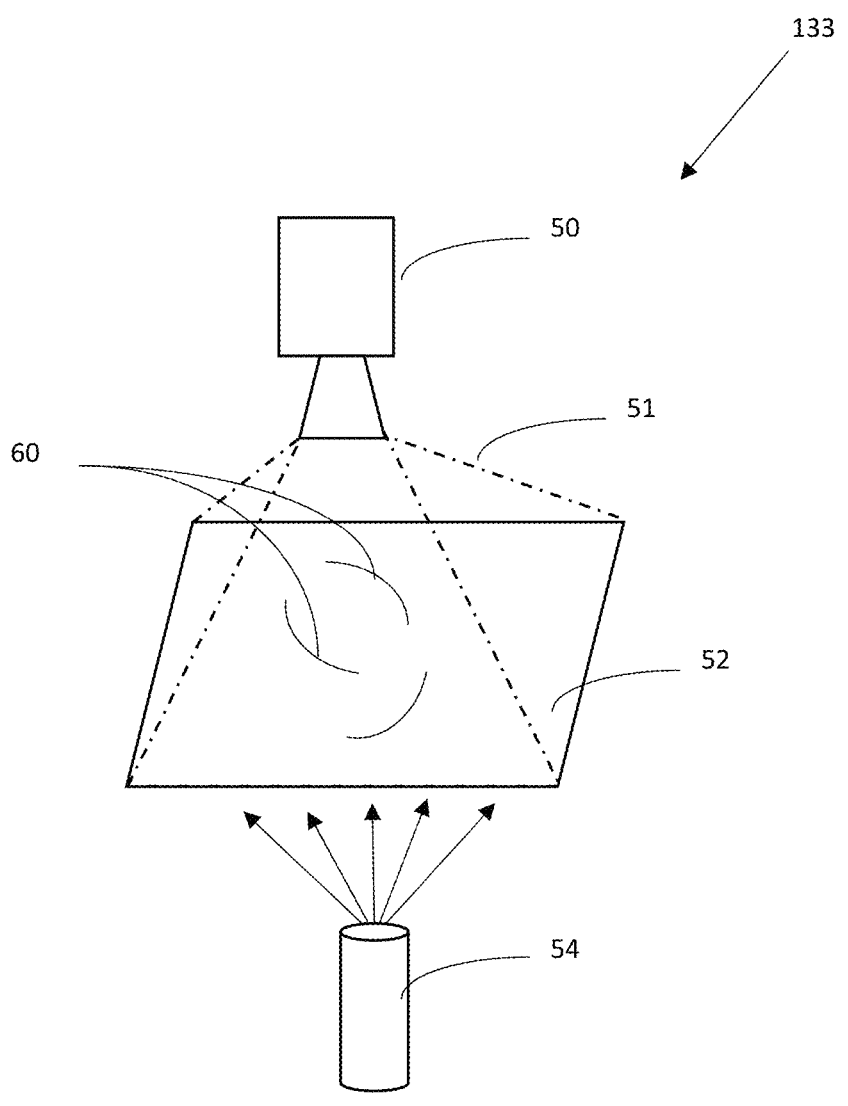
FIG. 2 illustrates an example image acquisition subsystem.

Prior to or after being placed on/in a bin, strip or tray of the post-use handling subsystem 132 (depending on whether the objects are imaged and 'counted out' before or after being so-deposited in the specific embodiment), the objects are imaged by the image acquisition subsystem 133. Referring to FIG. 2, the image acquisition subsystem 133 typically includes a camera 50 adapted to capture a visual image encompassing a field of view 51 within an image-capture station 52. Objects 60 to be imaged, or a collection of such objects, are deposited or placed in the image-capture station 52, either manually by hand, or as held by a continuous strip (which can be fed to the capture station 52) or tray into which they were prior deposited. In the case of a continuous strip holding a plurality of successively spaced objects, the strip can be indexed through the image-capture station 52 for successively imaging the held objects as described in the aforementioned patent applications incorporated herein. In the case of a tray holding a plurality of objects in respective deposit stations of the tray, they tray can be placed in the image-capture station 52 once it has been filled (to a desired degree) with objects to be imaged. Then the camera 50 captures an image which includes each object within the field of view 51. The associated image data then is communicated and input to the CNN for recognition as further described.

Optionally, the image acquisition subsystem 133 can include a lighting system 54 (such as a backlight as shown in FIG. 2), to illuminate objects 60 in the image-capture station 52 to facilitate capturing images thereof optimized for recognition by the CNN. For example, it has been discovered that backlighting the field of view 51 can present a silhouette of the illuminated objects 60 that helps to emphasize the shape of the objects in order that the CNN can more readily identify them based on its prior training. While such silhouetting can facilitate easier shape recognition by the CNN 134 by presenting stronger contrast between the object and its background, it comes with the tradeoff of diminished ability to differentiate between objects such as suture needles and their attached suture tails. However, it further has been discovered that backlighting the field of view 51 with collimated infrared light, preferably having a wavelength about 850 nm, achieves a good compromise between these competing effects; i.e. presenting strong contrast that facilitates shape recognition, while preserving distinct interfacial artifacts (i.e. image features) between the object (needle) and the extraneous attached feature (suture tail), so that the CNN 134 can differentiate them and ignore the suture tail when recognizing the object. For example, in the case of a suture needle and its suture tail, a relatively discrete 'notch' can be readily visualized, and reproduced in camera images, between the needle and its suture tail at the point of attachment when using collimated 850 nm backlighting.

The image acquisition subsystem 133 may also be configured to pre-process the acquired images prior to their being input into the CNN 134. For example, the images may be cropped to a desired size in order to shrink the effective field of view containing objects 60 to be recognized by the CNN. In case a captured image contains a plurality of objects to be recognized, the image can be decomposed in order to segregate individual objects into their own sub-images, which then can be fed individually to the CNN 134 to recognize the objects contained in the respective sub-images. Captured images (or sub-images) also may be filtered, de-noised, sharpened or blurred, or the like in order to remove extraneous artifacts from the images. Other pre-processing operations may include segmentation of the images. For example, static color thresholds may be used to segment the object from any background of the image so that only the image of the object is input to the CNN 134. In the embodiment noted above where the image is taken with an 850 nm collimated backlight, the silhouette created around the object allows the object to more easily be identified by thresholding against the background. In instances where the object is a needle or the like having a suture tail, the pre-processing may also segment the suture tail from the needle even before supplying the image(s) to the CNN, based on logic steps that rely on the discrete observable interface between the needle and its tail. For example, in addition to color thresholding, the suture tail may be segmented by identifying the notch where the smaller diameter of a suture tail meets the larger diameter of a needle.

These and other desirable image-processing operations may be executed in order to remove extraneous noise or data from images, which may accelerate object-recognition by the CNN 134 and reduce the error rate. Such image-processing operations can be automated by a processor of the image acquisition subsystem 133, or they may be performed by one or more processors of the data processing system 120. They also may be implemented by the CNN 134 itself. For example, the CNN 134 may be trained to perform the segmentation of images described above. In a further alternative, such image-processing operations can be performed by a user e.g., by manually selecting each object in a given image via the user interface 110, to focus the CNN image-recognition activity to only the selected image. Combinations of such processing steps also can be performed.

In some embodiments, the post-use handling and image acquisition subsystems 132 and 133 may be integrated. For example an object 60 may be placed on a tray (not shown) after use, which is located in the image-capture station 52. After image acquisition, the tray may be covered to enclose the object 60 on or in the tray; or the entire tray and its contents may be stored on a shelf or deposited into a bio-hazard bin.

Figure 3:
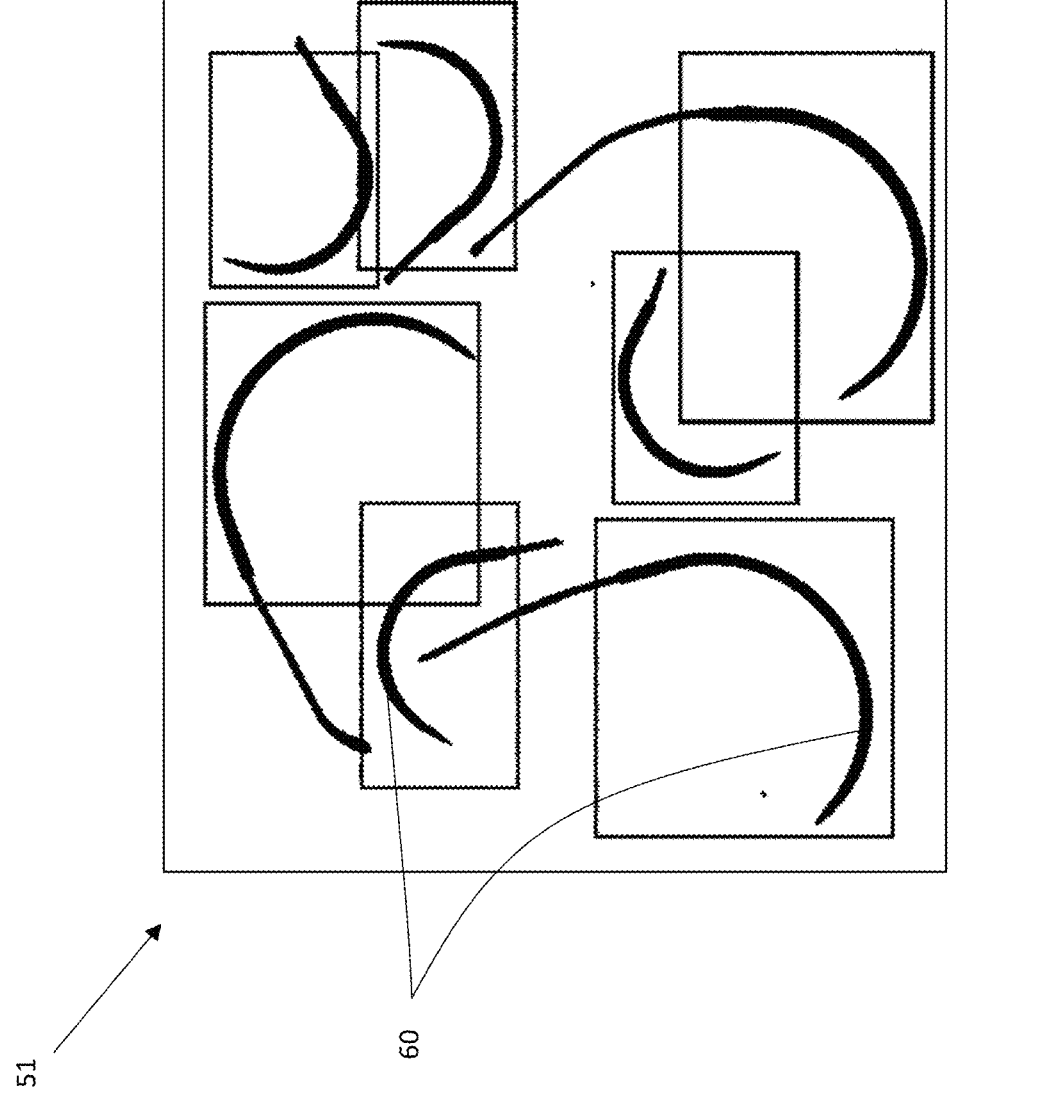
FIG. 3 illustrates an example field of view/image having a plurality of objects therein input to a convolutional neural network.

In order to recognize (and thereby 'count out;' as well as 'count in' if desired) individual objects (e.g. sharps) for a medical procedure, each image from the image acquisition subsystem 133 containing one or more such objects is inputted into the CNN 134. The CNN 134 may be a multi-layer CNN that employs combinations of convolution, ReLU, pooling, and/or classification layers. Through these layers, the CNN 134 is trained to extract and classify features of the objects in the input images. For example, an image including multiple objects 60 (suture needles having suture tails still attached) in a single field of view 51 is illustrated in FIG. 3. As seen there, the suture needles 60 have a curved portion and a sharp end. The CNN 134 may thus be trained to recognize and extract these features of the objects 60 (e.g., as denoted in FIG. 3 by the rectangular boxes therearound). In contrast, extracted features of a scalpel may include the scalpel's straighter shape and elongated blade. These extracted features are then pooled and fed into a classifier to identify the object. The classifier matches are probability weighted to determine the most likely classification(s). According to one particular example, a CNN built on Tensorflow EDGE and trained with 1,075 images was able to detect the presence of a needle with an accuracy of 100%, and to identify the specific needle model at an average of 96%. Moreover these results were reproducible with 99% precision.

As noted above, the CNN 134 may be configured to identify multiple objects in a single image or field of view 51. Alternatively, an image or field of view 51 such as in FIG. 3 may be pre-processed to isolate each of the depicted objects into its own sub-image (e.g., via segmentation), wherein the respective sub-images would be input separately into the CNN 134. In either case, the CNN 134 is configured to output the classification(s) for each such object.

In addition to the classification, the CNN 134 may be configured to output a score (e.g., the weighted probability or confidence level of the classification) for each object. In other words, based on an input image, the CNN 134 outputs a classification(s) of the object(s) in each image, and a confidence level for each such object that its classification is accurate (the score). Where multiple objects are in the image, the output of the CNN 134 may include a classification and score for each of the objects. The outputs of the CNN 134 then are processed (e.g. by the data processing system 120 and/or the reconciliation report subsystem 135) in order to 'count out' the recognized objects. Objects that are 'counted out' in this manner can be tabulated in a list of such objects, which then can be compared to the aforementioned list of objects that were 'counted in' prior to or during the medical procedure.

As noted, the CNN 134 can output not only a classification for each recognized object, but a confidence score reflecting the probability that the classification is correct. The greater the confidence score, the greater the probability of accuracy in the classification. The confidence score can fall, e.g., within a scale of 0-100%, with 0 reflecting zero confidence, and 100% reflecting certainty that the classification is accurate. The data processing system 120 and/or reconciliation report subsystem 135 can be configured to carry out verification for confidence scores below a threshold score. For example, if the threshold score were 50%, then any outputs of the CNN 134 having confidence scores below 50% would be subject to further verification.

In one embodiment, the data processing system 120 and/or reconciliation report subsystem 135 can execute such further verification by interrogating the counted-in list and/or the counted-out list (the latter being for objects that already had been recognized and counted out based on acceptable confidence scores), to cross-check the classification of the suspect object. If the classification either fails to match any counted-in object, or matches only objects that had been both counted in and counted out, then the data processing system 120 and/or reconciliation report subsystem 135 can use that knowledge to negatively impact the confidence score for the suspect object. Alternatively, if the classification matches a counted-in object that has not yet been counted out, that verification information may positively impact the confidence score. The processing system 120 and/or reconciliation report subsystem 135 can factor the verification information into a reassessment of the confidence score for the original classification of the suspect object. In some embodiments, the verification information may be communicated to the CNN subsystem 134 to perform the confidence score reassessment.

If the reassessed score exceeds the threshold score, then the suspect object can be counted out, and added to the counted-out list. But if the re-assessed score remains below the threshold score, then the CNN 134 can be configured to reject its initial classification of the suspect object, and to attempt re-classification of the same. The re-classified suspect object with its own confidence score then would be subject to the same processing. This procedure can be executed continuously in a loop until an acceptable confidence score has been achieved, in order that the suspect object is accepted by the data processing system 120 and/or reconciliation report subsystem 135, and added to the counted-out list. Alternatively, the data processing system 120 and/or reconciliation report subsystem 135 can be configured to issue an alarm (e.g., via the user interface 110) to the user if the confidence score for the first or any subsequent re-classification of a suspect object fails to meet the threshold score. The data processing system 120 and/or reconciliation report subsystem 135 also can be programmed to issue an alarm to the user in every case when the confidence score for a particular object fails to meet the threshold score, in order that even if properly re-classified by the CNN 134, manual user verification also can be used to check the re-classification. Manual user verifications may also be used to further train the CNN 134. In addition, any likely improper classification outputs (determined through verification as discussed here) may be provided to the CNN 134 to train it not to repeat the same likely improper classifications.

According to one example, a true-size 10 needle is imaged, and the image is input to the CNN 134. The CNN 134 outputs a size 10 classification with a 50% confidence score, and a size 11 classification with a 50% confidence score. Because no classification exceeds a 50% threshold score, the system attempts to count out the needle through comparison with the counted-in list. If a size 10 needle was previously counted in, but a size 11 needle was never counted in, the confidence score may be adjusted to support classification of a size 10 needle, while decreasing the score of a size 11 classification—and the needle is counted out. However, if neither a size 10 needle nor a size 11 needle was counted in, the confidence of each classification may be reduced and the image sent back to the CNN 134 for an attempt to reclassify with the knowledge that size 10 and size 11 classifications both are likely improper.

At the end of the procedure (e.g. prior to closing a surgical field), the user can enter an input into the system 100 via the user interface 110 to indicate that it is time to reconcile counted-in objects against counted-out objects, to ensure no objects are unaccounted for, e.g. have been left in the patient. Upon receipt of that input, the user interface 110 can activate a reconciliation report subsystem 135, which compares the list of counted-out objects with the list of counted-in objects and generates a report that can be outputted to the user (e.g. via user interface 110). If the counted-in and counted-out lists match exactly, such that there are no extra objects in either list not reflected in the other, then the report may simply be an indication outputted to the user via the user interface 110 in the form of an audio or visual signal that all objects are accounted-for and it is thus safe to close the medical procedure. Alternatively, and particularly when there is a discrepancy between the counted-in and counted-out lists, the report may be a detailed list of each object that was counted in and counted out, so that specific object discrepancies can be easily seen and compared. This report may be displayed on a display screen of the user interface 110, or it may be transmitted to a remote device, such as a printer or smart device, for further inspection.

In the event that objects counted in have not yet been counted out, the user (or surgeon) can investigate the surgical field and the surrounding area to look for the missing object. If it is found, it can be deposited with the system 100 so that it is imaged via the image acquisition subsystem 133, then recognized by the CNN 134, and if appropriate, added to the counted-out list by the data processing system 120. This procedure can be followed for each object from the counted-in list not accounted for in the counted-out list at the end of a medical procedure, until a comparison of those two lists results in the reconciliation report subsystem 135 issuing a report indicating that all objects have been accounted for. If, however, a counted-in object that has not been counted out cannot be found, then the user (or surgeon) can manually audit or re-count all objects that have been counted out from the bin, tray, tape, etc. where they have been deposited for storage during the procedure. Alternatively, if an object having no entry in the counted-in list nevertheless appears in the counted-out list, the reconciliation report subsystem 135 can so reflect that fact in its report, whereupon again the user can manually audit the objects that were counted in and ultimately deposited for storage into a bin, tray, tape, etc.

The reconciliation report subsystem 135 may output a single report following a total count at or near the end of the medical procedure (e.g. when the user inputs into the user interface 110 that the procedure is complete), and/or it may provide reconciliation updates in real time. The reconciliation report may particularly indicate each of the known objects used during the medical procedure from the count-in subsystem 131, and each of the objects later identified by the CNN 134 and thus counted out, thus showing a real-time one-to-one correlation of used and consumed objects. In this way, any missing (or otherwise uncounted) objects may be easily identified in real time. If any objects are unable to be identified by the CNN 134 (e.g., the confidence level for classification is lower than the desired threshold and re-classification thereof does not yield an acceptable confidence level), or any objects are missing, an alert may be displayed or sounded. In such instances, another image of the object may be captured and the other image input to the CNN 134, or the object may be counted manually. Such manual counts may be added to the system via the user interface, so that the total count (and reconciliation thereof) includes those from the CNN 134 and any manual counts.

Further, displays and sounds may be output via the user interface indicating a running tally (e.g., an aggregate count) of the used objects that have been both counted in and subsequently counted out. For example, the running tally may be identified as a displayed number or audibly announced number, as progress bar, or the like. Still further the number of objects remaining in the procedure (e.g., remaining the operating room) may also be output to the user. For example, the aggregate count of objects may be subtracted from the total number of objects counted in to produce an "On the Field" value. Such a value provides another check for medical personnel to ensure all objects are accounted for during the procedure, for example, by comparing the On the Field value to the remaining available objects that were initially counted in via the count-in subsystem 131, but which have not yet been recognized by the CNN 134 and counted out.

The CNN 134 may be initially trained according to a supervised training method. For example, a training data set may include images of various objects with the corresponding ground truth (i.e., the identification of the object). Training data sets may also include images having a plurality of objects, with the identification of each object therein. The CNN 134 may also be continually trained during its use. For example, images captured by the image-acquisition subsystem 133 and input to the CNN 134 during a medical procedure may be used for further training, with an indication of whether the output classification was accurate, as well as its associated confidence score. This may be particularly valuable in cases when the confidence score for (at least) the initial classification of a recognized object was below the threshold confidence score. Indeed, the data processing system 120 may be configured to retain and to use for training the CNN 134 all such images where this was the case.

As suggested above, the CNN 134 may be implemented by a processor and memory locally; e.g. within and as part of the data processing unit 120 or as a distinct but locally-connected subsystem, both as described above. However, in other embodiments, the CNN 134 may be maintained remotely, for example, at a central server location accessible by the data processing system 120 via a network, e.g. a cloud-based network such as the Internet. In such cases, image information from the image acquisition subsystem 133 may be transmitted to the remote location of the CNN 134 via the aforementioned network. Similarly, an output of the CNN 134 may be transmitted back from the remote location to the data processing system 120 via the network. In this manner, the CNN 134 may be centrally maintained for use in more than one implementation (e.g., across many operating rooms and hospitals), and for aggregating as many input images as possible for continued training. Further in this manner, the CNN 134 can be trained based on images, and verifications of objects in those images, obtained from a multitude of different procedures at different locations that may be remote from one another. Moreover, in this manner the CNN 134 may be common to a plurality of systems 100 running concurrently (e.g., each performing a medical procedure at the same time) and located remote from one another.

Figure 4:
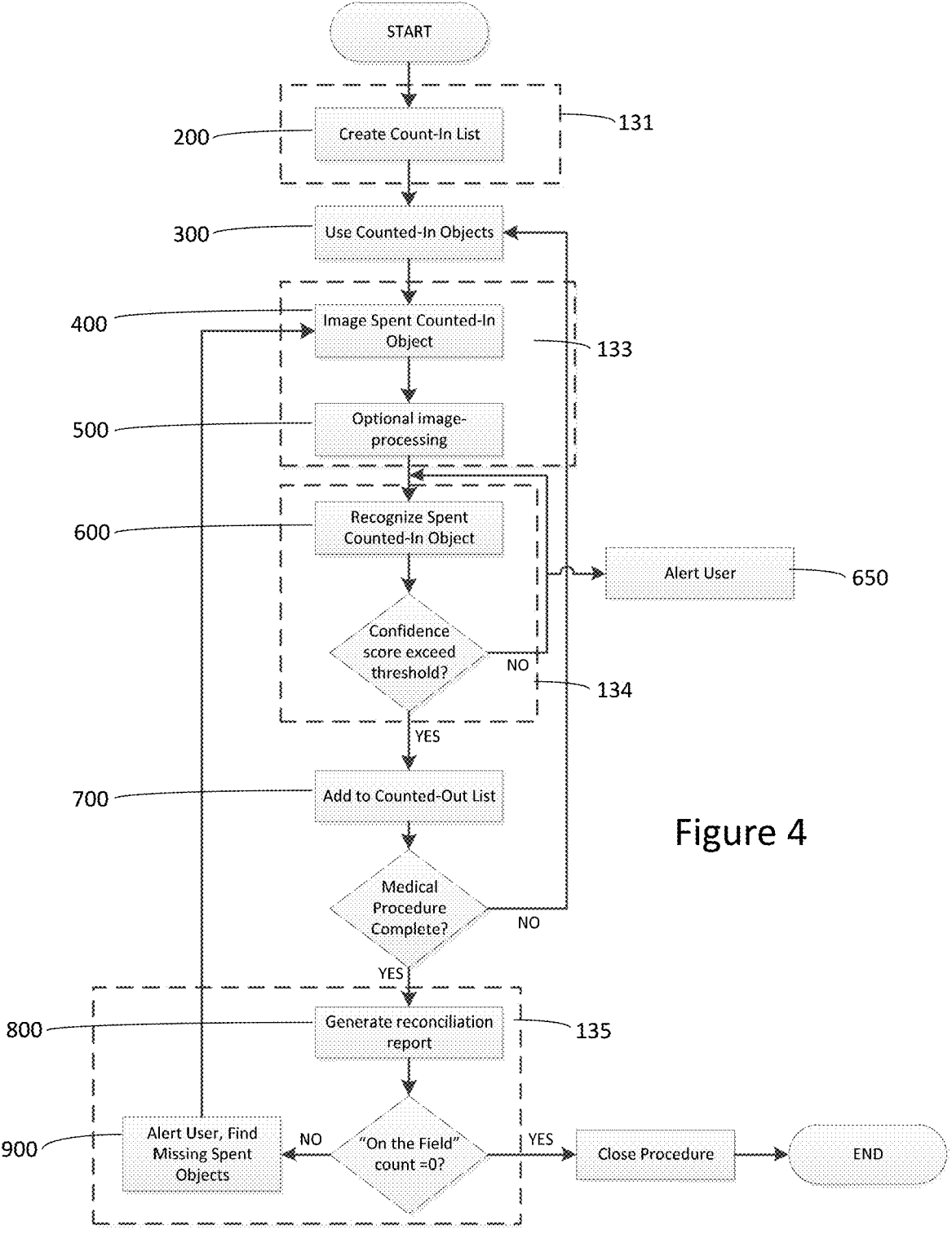
FIG. 4 illustrates a process-flow diagram for an example process of the present disclosure.

FIG. 4 illustrates a process-flow diagram for an example process as herein disclosed, which can be carried out using the disclosed system 100. At the start, at step 200 the count-in subsystem 131 generates a count-in list of objects to be used in (or which are requested during) the medical procedure. The count-in list can be generated via manual entry of objects to be used (via the user interface 110), scanning machine-readable indicia associated with each such object, recognition of the object(s) via the CNN 134, or any combination of these. Once the count-in step 200 is completed (for all objects to be used, or as objects are requested by the surgeon), the object(s) can be used in the medical procedure at step 300.

Once an object is no longer required or in-use during the medical procedure, it may be considered spent. Spent objects are supplied to the image acquisition system 133 where they are imaged at step 400. As noted above, individual spent objects may be imaged at step 400 individually. Alternatively, a plurality of spent objects may be grouped together (e.g. in a tray) and imaged together at step 400 to generate a single image comprising all the grouped objects. Thereafter, optionally at step 500 the image acquisition subsystem 133 can be configured to perform image-processing steps on the captured images, in order to remove extraneous artifacts and/or to separate into sub-images objects that otherwise were grouped together, in order to improve object recognition by the CNN 134 in subsequent steps.

The captured images (which optionally may have been image-processed) next are input to the CNN 134, where each imaged object is recognized at step 600 and assigned a classification and a confidence score. The classification identifies what the CNN 134 has concluded the object to be, and the confidence score represents the probability that the classification is correct. If the confidence score meets or exceeds a predetermined confidence score threshold, then the associated object is added to a counted-out list by the data processing system 110. The counted-out list represents the list of spent objects to be compared to the list of counted-in objects that are known to have been introduced to the medical procedure, to ensure all such objects are accounted for prior to concluding the procedure. If, however, the confidence score does not at least meet the confidence score threshold, then the image is re-recognized by the CNN 134 in order to assign a new classification and a new confidence score. This process is repeated until the confidence score reaches or exceeds the predetermined confidence threshold. Optionally, the system 100 also will issue an alert to the user via the user interface 110 at step 650 whenever the confidence threshold is not met, and preferably at least when the confidence threshold is not met for a re-classified object.

The foregoing steps are carried out for each object that is to be used for a medical procedure, and which is counted in via the count-in subsystem 131. Once the medical procedure is completed, the user can enter an input via the user interface 110 to notify the system 100 that it is time to operate the reconciliation report subsystem 135 to reconcile the counted-out list against the counted-in list, to determine whether any counted-in objects remain "on the field;" i.e. unaccounted for and thus presumed to still be within the operative field (and possibly inside the patient). The reconciliation report subsystem 135 generates a reconciliation report at step 800, which compares the two lists to identify any counted-in objects not reflected on the counted-out list (and vice versa). If the two lists match exactly, the resulting "on the field" value is equal to zero, and the user is notified via the user interface that the procedure may be closed and the process ends. If the two lists do not match, then the system issues an alert to the user via user interface 110, who then is notified to look for missing objects that have not yet been accounted for. If and as any such missing objects are found, they can be imaged by the image acquisition subsystem 133, recognized by the CNN 134 and, if appropriate, added to the counted-out list for reassessment by the reconciliation report subsystem 135, via steps 400-800 as described above. Alternatively, if an object appears on the counted-out list that did not appear on the counted-in list, then the user also is notified of that fact at step 900, and will be informed about which object the discrepancy exists so that she can perform an on-site investigation prior to closing the medical procedure.

While various features are presented above, it should be understood that the features may be used singly or in any combination thereof. Further, it should be understood that variations and modifications may occur to those skilled in the art to which the claimed examples pertain.

What we claim is:

1. A system for identifying objects used in a medical procedure, comprising:
a user interface;
a camera;
at least one processor and memory configured to:
   receive images of said objects after each said object is used in the medical procedure, the images being captured by the camera;
   input the images into a convolutional neural network (CNN), the CNN being configured to output a classification and a confidence score for each said object in each said inputted image;
   identify the objects in the images according to the outputted classifications and confidence scores therefor;
   reconcile each of the objects identified in the images with a counted-in list of objects for the medical procedure; and
   output information related to the reconciliation via the user interface; and
at least one of:
   a bin in which the objects are disposed after being reconciled,
   a continuous tape or strip to which the objects are deposited sequentially as used and prior to being imaged by said camera, and
   a tray having a plurality of spaced-apart deposit stations in or onto which the objects are deposited sequentially as used and prior to being imaged by the camera.

2. The system of claim 1, wherein the CNN is implemented by a CNN processor and a CNN memory, of the at least one processor and memory, and is shared by the system and a plurality of other similar systems over a network.

3. The system of claim 1, wherein the at least one processor and memory are further configured to, for each said object:
   compare the confidence score of the classification of the object to a predetermined threshold, and when the confidence score is below the predetermined threshold:

compare the classification of the object to the counted-in list of objects for the medical procedure;
   adjust the confidence score of the object based on the comparison.

4. The system of claim 3, wherein the at least one processor and memory are further configured to:
   compare the adjusted confidence score to the predetermined threshold, and when the adjusted confidence score is below the predetermined threshold:
   reinput the image of the object into the CNN, the CNN being configured to output a different classification and a different confidence score of the object; and
   identify the object according to the different classification and different confidence score.

5. The system of claim 1, wherein the at least one processor and memory are further configured to:
   repeatedly retrain the CNN with the received images of the objects.

6. The system of claim 1, wherein the user interface is configured to output an alarm when the classification of one of the identified objects does not match an object in the counted-in list.

7. The system of claim 1, further comprising a backlight configured to illuminate with infrared light a field of view for capturing said images via said camera.

8. The system of claim 7, said infrared light being collimated light having a wavelength about 850 nm.

9. A method comprising:
   generating a counted-in list of a plurality of objects to be used during a medical procedure;
   imaging the objects after use in the medical procedure, thereby generating at least one image;
   inputting the at least one image into a convolutional neural network (CNN), the CNN being configured to output a classification and a confidence score for each object in the at least one image;
   identifying the objects in the at least one image according to the outputted classification and confidence score;
   reconciling each of the objects identified in the at least one image against the counted-in list;
   outputting information related to the reconciliation;
   comparing the confidence score of the classification for the object to a predetermined threshold, the confidence score being below the predetermined threshold;
   thereafter comparing the classification of the object to the plurality of objects in the counted-in list; and
   adjusting the confidence score of the classification for the object based on the comparison.

10. The method of claim 9, wherein the at least one image is input into the CNN via a network.

11. The method of claim 9, further comprising:
   comparing the adjusted confidence score to the predetermined threshold, the adjusted score being below the predetermined threshold:
   reinputting the image of the object into the CNN, the CNN being configured to output a different classification of the object and a different confidence score therefor; and
   identifying the object according to the different classification and the different confidence score.

12. The method of claim 9, further comprising:
   repeatedly retraining the CNN with the received images of the objects.

13. The method of claim 9,
   wherein the classification of one of the identified objects in the images does not match any object in the counted-in list, and the method further comprises outputting an alarm indicating that the associated object has not been reconciled.

14. The method of claim 9, said objects being imaged by a camera along a field of view that is backlit with collimated light at a wavelength of about 850 nm.

15. The method of claim 9, said at least one image being preprocessed by applying a static color threshold to segment a said object therein from background in the at least one image so that only that portion of said at least one image comprising that object is input into the CNN for classification of that object.

16. A system comprising:

at least one processor and memory configured to implement a convolutional neural network (CNN), wherein the CNN is configured to:

receive images of objects used during a medical procedure;

output a classification of each object in the images and a confidence score corresponding to each said classification;

re-receive an image of a said object used during the medical procedure for which the CNN had outputted a prior classification and prior confidence score below a pre-determined threshold; and receive the prior classification and the prior confidence score of the object; and output a different classification of the object in the re-received image, and a different confidence score therefor, the different classification of the object and the different confidence score being at least in part based on the received prior classification and the received prior confidence score, wherein the CNN is configured to receive the images via a network from a plurality of remote locations.

* * * * *